US009949226B1

(12) United States Patent
Sun et al.

(10) Patent No.: US 9,949,226 B1
(45) Date of Patent: Apr. 17, 2018

(54) METHOD AND SYSTEM FOR ENHANCING ACCURACY IN LOCATION AND PROXIMITY DETERMINATION

(71) Applicant: Hong Kong Applied Science and Technology Research Institute Company Limited, Hong Kong (HK)

(72) Inventors: Chunhua Sun, Hong Kong (HK); Xinyi Liu, Hong Kong (HK); Eddy Chiu, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 15/285,493

(22) Filed: Oct. 5, 2016

(51) Int. Cl.
*H04W 24/00* (2009.01)
*H04W 64/00* (2009.01)
(Continued)

(52) U.S. Cl.
CPC .......... *H04W 64/00* (2013.01); *H04W 4/008* (2013.01); *H04W 4/02* (2013.01); *H04W 24/10* (2013.01); *H04W 40/244* (2013.01)

(58) Field of Classification Search
CPC ..... H04W 64/00; H04W 48/08; H04W 48/16; H04W 4/023; H04W 64/003; H04W 8/18; H04W 8/26
(Continued)

(56) References Cited

U.S. PATENT DOCUMENTS 8,750,894 B1 * 6/2014 Stogaitis ................ H04W 4/02
370/325

8,965,411 B1 2/2015 Busch-Sorensen et al.
(Continued)

FOREIGN PATENT DOCUMENTS

CN 103983266 A 8/2014
CN 104640076 A 5/2015
(Continued)

OTHER PUBLICATIONS

International Search Report and Written Opinion of PCT application No. PCT/CN2016/101712 issued from the International Search Authority dated Jun. 28, 2017.

*Primary Examiner* — Timothy Pham
(74) *Attorney, Agent, or Firm* — Spruson & Ferguson (Hong Kong) Limited

(57) ABSTRACT

A system comprising beacon-generating clusters for enabling a mobile computing device to perform location or proximity determination is provided. Each cluster comprises a primary station for broadcasting a primary beacon, and an offset-assisted station, positioned from the primary station by an offset distance along a direction, for broadcasting a secondary beacon. The offset distance and the direction are unique for all the clusters, causing a jittering area, within which the mobile computing device is unable to determine which one of adjacent primary stations is closer to from detecting the primary beacons, to be reduced by further utilizing the secondary beacons provided by the clusters. Fluctuation in received signal strength indicator (RSSI) can be reduced by having each station, primary or secondary, installed with multiple co-located broadcasting units for utilizing space and time diversity to reduce RSSI fluctuation. In another option, multiple offset-assisted stations are used for each cluster.

12 Claims, 10 Drawing Sheets

(51) Int. Cl.
*H04W 4/02* (2018.01)
*H04W 4/00* (2018.01)
*H04W 40/24* (2009.01)
*H04W 24/10* (2009.01)

(58) Field of Classification Search
USPC ..................................................... 455/456.2
See application file for complete search history.

(56) References Cited

U.S. PATENT DOCUMENTS

| | | | |
|---|---|---|---|
| 2003/0146871 A1* | 8/2003 | Karr | G01S 1/026 342/457 |
| 2005/0134456 A1 | 6/2005 | Niu et al. | |
| 2008/0039114 A1 | 2/2008 | Phatak et al. | |
| 2011/0227791 A1 | 9/2011 | Lin et al. | |
| 2013/0260693 A1* | 10/2013 | Un | G01S 5/02 455/67.11 |
| 2014/0185472 A1* | 7/2014 | Mansour | H04W 4/043 370/252 |
| 2015/0105099 A1 | 4/2015 | Luo et al. | |

FOREIGN PATENT DOCUMENTS

| | | |
|---|---|---|
| CN | 105353351 A | 2/2016 |
| CN | 105472563 A | 4/2016 |
| WO | 2010/022797 A1 | 3/2010 |
| WO | 2016/069956 A1 | 5/2016 |

\* cited by examiner

METHOD AND SYSTEM FOR ENHANCING ACCURACY IN LOCATION AND PROXIMITY DETERMINATION

FIELD OF THE INVENTION

The present invention relates to location or proximity determination by a mobile computing device based on beacons sent from nearby beacon-generating stations.

BACKGROUND

The following definitions are used herein in the specification and the appended claims. "Location determination" means determining a location of a certain device. Usually, location determination is assisted by installing a network of beacon-broadcasting stations at known locations over a region of interest such that when the device listens to the beacons sent out by these stations, the location of the device is estimable by the signal strengths of the received beacons or by the arrival times thereof. "Proximity determination" means determining a degree of proximity between a device and a certain beacon-broadcasting station. "A degree of proximity" is a descriptive qualifier for indicating how close a device is distant from a beacon-broadcasting station. As one example, a set of such descriptive qualifiers includes "immediate," "near," "far" and "unknown." Note that proximity determination does not provide a quantitative value of distance between the device and the station. Proximity determination may be implemented by first measuring a received signal strength indicator (RSSI) value of the beacon sent out from the station. Then the measured RSSI value is mapped to a corresponding descriptive qualifier. This approach is usually employed for a Bluetooth Low Energy- (BLE-)enabled device. "A mobile computing device" is a portable electronic device having computing power, and configured to provide wireless communications and to support location or proximity determination. For example, a mobile computing device may be a BLE-enabled smartphone, or a handheld tablet computer equipped with BLE-compliant functionalities.

BLE signals from battery-driven beacon-broadcasting stations are at the core of the indoor location technology. A mobile computing device detects a beacon from one beacon-broadcasting station and can calculate roughly the distance to this station and hence estimate the location of the mobile computing device. The stations are placed at known locations around an area of interest and each station repeatedly transmits a radio beacon. When the mobile computing device detects the beacons transmitted by the stations, the position of the mobile computing device relative the stations can be determined by measuring RSSI values of the transmitted beacons. However, one practical problem encountered in BLE location-determining system is that BLE beacons are transmitted in an industrial, scientific and medical (ISM) band. The presence of co-channel interference, such as WiFi signals, introduces fluctuation of the measured RSSI values and hence reduces the location-determining accuracy achieved by the system. Another factor that increases RSSI fluctuation is the occurrence of multipath fading, especially in an indoor environment where location determination is required. It is desirable to reduce RSSI fluctuation in order to enhance location-determining accuracy in the presence of co-channel interference and multipath fading.

The BLE system is also useful for proximity determination. FIG. 1 depicts a practical scheme of partitioning a broadcasting coverage area 170 of a BLE beacon-generation station 105 into a plurality of zones for proximity determination. A first zone 110 of "immediate" is assigned for a region within 0.5 m from the station 105, a second zone 120 of "near" for another region between 0.5 m and 2 m, a third zone 130 of "far" for a farther region between 2 m to 30 m, and possibly an extra zone 140 of "unknown" classified as a region when a mobile computing device 107 is outside the broadcasting coverage area 170. Other partitioning schemes are also possible. In some schemes, the third zone 130 may be extended up to 50 m or even 100 m, depending on the transmitted power. However, in some location-based applications, the size of the third zone 130 may be considered too large. A scheme having finer zones is desirable. If the RSSI fluctuation due to co-channel interference and multipath fading can be reduced, the realization of such scheme is made easier.

Apart from the need to reduce RSSI fluctuation, there is another challenge encountered in BLE systems. For advanced solutions to location determination, where it is desired to locate a user of the mobile computing device accurately in a two-dimensional region and show the user's whereabouts (zone or position) on a map, several BLE beacon-broadcasting stations are required. Ideally, the stations have contiguous broadcasting coverage areas, usually the same in size, so that when the mobile computing navigates from one broadcasting coverage area to another, the station closest to the mobile computing device can be clearly identified. Practically, however, the broadcasting coverage areas of adjacent stations are usually overlapped. There is a chance that the mobile computing device falls into a jittering area between two or more zones. The jittering area is an area of overlap between zones. The presence of jittering area creates uncertainty in location determination in that the mobile computing device is unable to determine which one of two or more adjacent stations is closer to. It is also desirable if the jittering area can be reduced as much as possible.

Existing techniques attempting to increase positioning accuracy in location or proximity determination includes, for example, the following. In a system disclosed by CN103983266, movement directions and steps of a user are further monitored in addition to using beacons. In another system suggested by CN105353351, arrival times of multiple beacons are analyzed to improve the positioning accuracy. In yet another system disclosed by U.S. Pat. No. 8,965,411, different transmit powers for different beacons are employed, offering additional information useful for increasing the positioning accuracy. However, the aforementioned three systems have a common disadvantage that system design is significantly complicated. Applying the techniques used in these three systems to a BLE system implies considerable modification to the BLE system is required. In a system of US2015105099, each beacon is associated with a group value. Grouping may be based on multiple criteria including geographical location, work team assignment, transceiver type or other constraining information. Beacons with minority group values are then excluded in RSSI determination. However, RSSI fluctuation may introduce incorrect beacon exclusions and thus reduces the positioning accuracy. Furthermore, grouping results are required to be adjusted when new beacons are deployed. The latter disadvantage complicates the system design.

In view of the above-mentioned observations, there is a need in the art to have a technique for reducing RSSI fluctuation at a mobile computing device in the presence of co-channel interference and multipath fading during beacon signal measurement as well as for reducing the jittering area. The technique is not only for BLE systems but also useful to other wireless systems using beacons for the mobile computing device to perform location or proximity determination.

SUMMARY OF THE INVENTION

In a first aspect of the present invention, a system for enabling a mobile computing device to perform location or proximity determination is provided with an advantage of reducing a jittering area.

The system comprises plural beacon-broadcasting clusters. An individual cluster comprises a primary station for broadcasting a primary beacon, and one or more offset-assisted stations each for broadcasting a secondary beacon. Each offset-assisted station has a broadcasting coverage area substantially similar to the primary station's broadcasting coverage area in size. If there is only one offset-assisted station in the individual cluster, the offset-assisted station is positioned from the primary station by an offset distance along a pre-determined direction. If there are plural offset-assisted stations in the individual cluster, the primary beacon and the offset-assisted stations of the individual cluster are positioned to form an evenly-spaced station sequence with the primary station at an end of the sequence. In addition, successive stations in the sequence are spaced by the offset distance, and each offset-assisted station is oriented from the primary beacon along the pre-determined direction. Among the clusters, the broadcasting coverage areas of adjacent two or more of the primary stations are mutually partially-overlapped. Furthermore, the offset distance and the direction used in defining locations of the primary station and each offset-assisted station in the individual cluster are unique for all the clusters. It causes the jittering area, within which the mobile computing device is unable to determine which one of said adjacent two or more primary stations is closer to from detecting the primary beacons of said adjacent two or more primary stations, to be reduced by further utilizing the secondary beacons provided by the clusters having said adjacent two or more primary stations.

The direction and the offset distance may be selected such that in the individual cluster, each offset-assisted station is located inside the primary station's broadcasting coverage area not overlapped with the broadcasting coverage area of any other cluster's primary station.

The direction may also be selected to be substantially similar to a pointing direction from a first primary station to a second primary station, wherein the first and second primary stations are selected from the plural primary stations in the clusters and have overlapped broadcasting coverage areas. The offset distance may be selected to be less than half of the distance between the first and second primary stations.

In a second aspect of the present invention, the system disclosed in the first aspect is further improved for reducing RSSI fluctuation.

In the system, the primary station of the individual cluster comprises a first group of plural co-located broadcasting units. Each of the broadcasting units in the first group is configured to broadcast a component primary-beacon signal such that the component primary-beacon signals broadcast from all the broadcasting units in the first group collectively form the primary beacon. In addition, the component primary-beacon signals are individually distinguishable at the mobile computing device, thereby allowing the mobile computing device to utilize diversity reception of the primary beacon to enhance a RSSI value thereof measured at the mobile computing device.

In addition, each offset-assisted station in the individual cluster comprises a second group of plural co-located broadcasting units. Each broadcasting unit in the second group is configured to broadcast a component secondary-beacon signal such that the component secondary-beacon signals broadcast from all the broadcasting units in the second group collectively form the secondary beacon. The component secondary-beacon signals are individually distinguishable at the mobile computing device to thereby allow the mobile computing device to utilize diversity reception of the secondary beacon to enhance a RSSI value thereof measured at the mobile computing device.

In a third aspect of the present invention, it is provided with a method for performing location or proximity determination by a mobile computing device when any of the embodiments of the system disclosed above is provided.

According to the method, the primary beacon sent from the individual cluster and received at the mobile computing device is measured to give a first RSSI value unless the primary beacon is not detectable. When space diversity is employed, the first RSSI value is obtained by averaging plural RSSI values of the component primary-beacon signals broadcast from all the broadcasting units in the first group. When time diversity is further employed, each of the component primary-beacon signals broadcast from each broadcasting unit is measured at different time instants over a pre-defined time window is measured to give more-than-one RSSI values for averaging.

Additionally, each secondary beacon sent from the individual cluster and received at the mobile computing device is measured to give a second RSSI value unless the secondary beacon is not detectable. When space diversity is employed, the second RSSI value is obtained by averaging plural RSSI values of the component secondary-beacon signals broadcast from all the broadcasting units in the second group. When time diversity is further employed, each of the component secondary-beacon signals broadcast from each broadcasting unit is measured at different time instants over the pre-defined time window to give more-than-one RSSI values for averaging.

The steps of measuring the primary beacon and of measuring each secondary beacon are repeated for all the clusters.

According to the first and second RSSI values that are obtained, determine whether the mobile computing device is located outside an augmented coverage area. The augmented coverage area is formed by augmenting the broadcasting coverage areas of the primary and offset-assisted stations in the clusters.

When it is determined that the mobile computing device is not outside the augmented coverage area, determine a zone on which the mobile computing device is located according to the first and second RSSI values that are obtained. The zone is selected from a plurality of candidate zones. The candidate zones are obtained by partitioning the augmented coverage area along boundaries of the broadcasting coverage areas of all the primary and offset-assisted stations in the clusters.

Other aspects of the present invention are disclosed as illustrated by the embodiments hereinafter.

DETAILED DESCRIPTION

Figure 1:
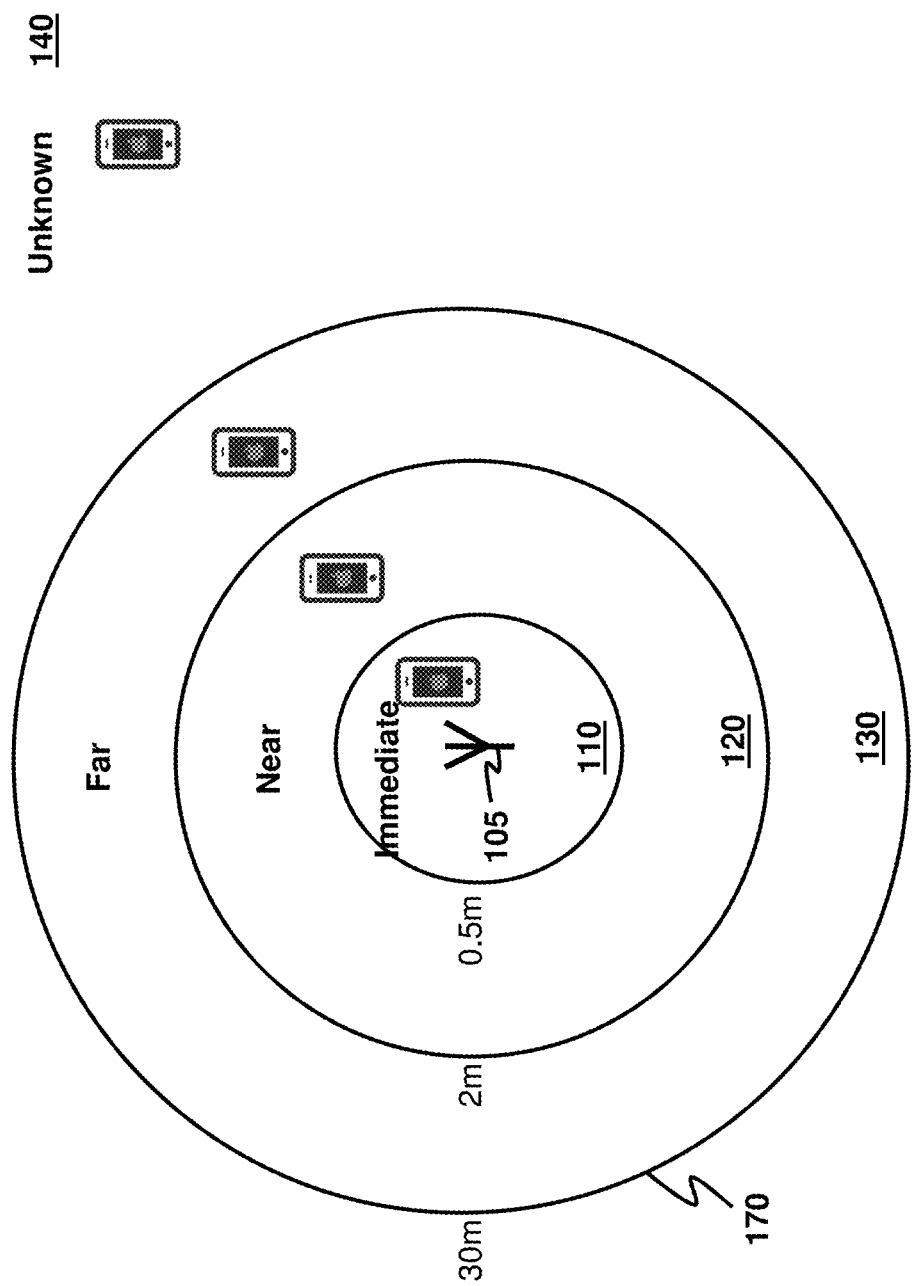
FIG. 1 depicts a scheme of partitioning a broadcasting coverage area of a BLE beacon-generation station into a plurality of zones for proximity determination.

Herein in the specification and the appended claims, the following definitions are also used. "A broadcasting coverage area" of a beacon-broadcasting station means an area within which the signal strength of a beacon sent out by the station is higher than a pre-determined threshold signal strength, where the signal strength of the beacon is a predicted one or an actually measured one, whichever more appropriate as determined by those skilled in the art according to practical situations. For example, if the station is designed to have to a certain broadcasting coverage area, the aforementioned signal strength is preferably a predicted one. In case the station is in situ tuned to have a certain broadcasting coverage area, the aforementioned signal strength is preferably a measured one. The threshold signal strength is usually determined according to the radio-signal detection sensitivity of a device that intends to receive the beacon. "A primary station" in a system used for enabling a mobile computing device to perform location or proximity determination means a beacon-broadcasting station that the mobile computing device references to in location or proximity determination. For example, the primary station acts as a reference point such that the mobile computing device determines and reports its location as a distance from the primary station. "An offset-assisted station" means a beacon-broadcasting station working with a certain primary station, where the offset-assisted station is not physically located at the same place of the primary station, and broadcasts additional beacon(s) to a mobile computing device to assist the mobile computing device to determine its location or proximity from the primary station. The offset-assisted station is said to be "associated with" the aforesaid certain primary station. Usually, the offset-assisted station is located nearby this primary station. "A cluster" or "a beacon-broadcasting cluster" means a set of beacon-broadcasting stations including one primary station and one or more offset-assisted stations associated therewith.

Although the present invention has an obvious practical application to a BLE system, the present invention is not limited only to a location or proximity determining system compliant to a BLE specification. The present invention is applicable to any location or proximity determining system based on using beacons to enable a mobile computing device to perform location or proximity determination.

A first aspect of the present invention is to provide a system for enabling a mobile computing device to perform location or proximity determination with an advantage that a jittering area in the presence of overlapped broadcasting coverage areas is reduced.

The inventors have found that the jittering area can be reduced by introducing one or more auxiliary beacon-generating stations offset-located from each originally-used station. In this way, location or proximity determination by a mobile computing device is more accurate by means of additional information provided by the auxiliary stations augmented with the information provided by the originally-used station. For the sake of clarity, the aforesaid station is referred to as a primary station, and each auxiliary beacon-generating station is named as an offset-assisted station.

Exemplarily, the system as disclosed herein comprises plural beacon-broadcasting clusters. An individual cluster comprises a primary station for broadcasting a primary beacon usable to the mobile computing device in location or proximity determination. The primary station has a broadcasting coverage area. The individual cluster further comprises one or more offset-assisted stations each for broadcasting a secondary beacon usable to the mobile computing device in location or proximity determination. Each offset-assisted station has a broadcasting coverage area substantially similar to the primary station's broadcasting coverage area in size. The primary beacon and each secondary beacon are configured to be distinguishable at the mobile computing device, such that pieces of information derived from the primary and secondary beacons are independent and hence combinable for enhancing position accuracy in location or proximity determination. If the primary and secondary beacons are compliant to the BLE specification, these beacons can be made distinguishable at the mobile computing device by coding these beacons with different UUID, major, and minor values according to the BLE specification, and optionally by transmitting these beacons at different BLE-defined radio channels.

Among the clusters, the broadcasting coverage areas of adjacent two or more of the primary stations are mutually partially-overlapped. This condition is only a reflection of the creation of one or more jittering areas, which the present invention is aimed to tackle with. Clearly, it is possible that the system includes one or more standalone primary stations each having broadcasting coverage areas not overlapped with the broadcasting coverage area of any other primary station in the system.

In the individual cluster, the primary station and the one or more secondary stations are positioned in a specific way as follows. In the simplest case that there is only one secondary station in the individual cluster, the offset-assisted station is positioned from the primary station by an offset distance along a pre-determined direction. If the individual cluster has plural offset-assisted stations, the primary beacon and the offset-assisted stations are positioned to form an evenly-spaced sequence of stations with the primary station at an end of the sequence. Successive stations in the sequence are spaced by the offset distance, and each offset-assisted station is oriented from the primary beacon along the pre-determined direction. In particular, the offset distance and the pre-determined direction used in defining locations of the primary station and the one or more offset-assisted stations in the individual cluster are unique for all the clusters in the system. As will be demonstrated later, this condition causes a jittering area, within which the mobile computing device is unable to determine which one of primary stations having overlapping broadcasting coverage areas is closer to from detecting the primary beacons of these primary stations, to be reduced by further utilizing the secondary beacons provided by the clusters having these primary stations.

To demonstrate the reduction of jittering area, consider a representative case that there are two primary stations having partially-overlapped broadcasting coverage areas. Those skilled in the art will appreciate that the same reasoning in jittering-area reduction carries over to cases with more than two primary stations.

Figure 2A:
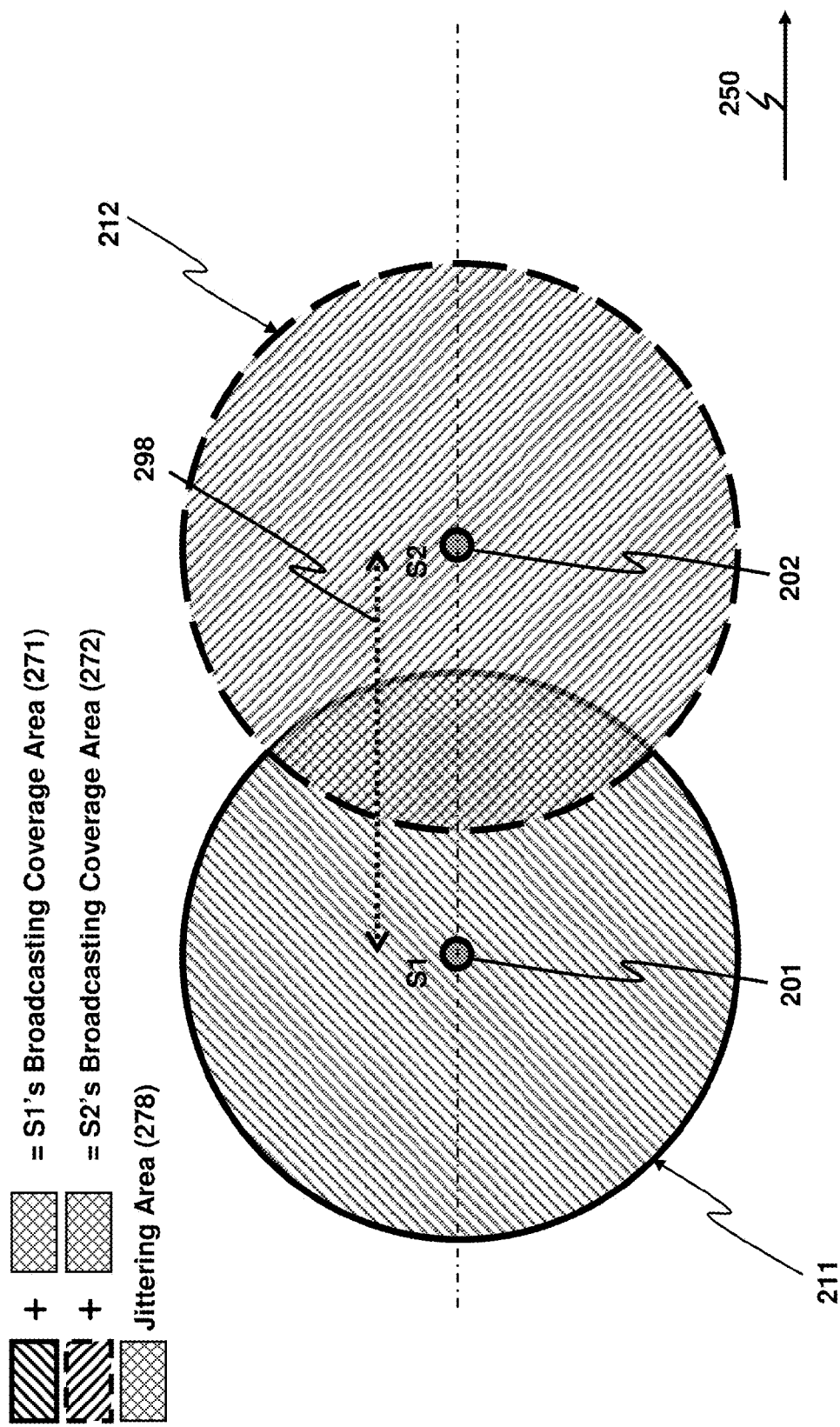
FIG. 2A depicts a network having two primary stations for beacon broadcasting.

FIG. 2A depicts a first primary station 201 (labeled as "S1") and a second primary station 202 (labeled as "S2") having a first broadcasting coverage area 271 and a second broadcasting coverage area 272, respectively. The first broadcasting coverage area 271 and the second broadcasting coverage area 272 are bounded by a first boundary 211 and a second boundary 212, respectively. The two broadcasting coverage areas 271, 272 are set to have the same size for simplicity. Note that the overlapping of the two broadcasting coverage areas 271, 272 creates a jittering area 278. For convenience, the pointing direction from the first primary station 201 to the second primary station 202 is referenced by the numeral 250.

Figure 2B:
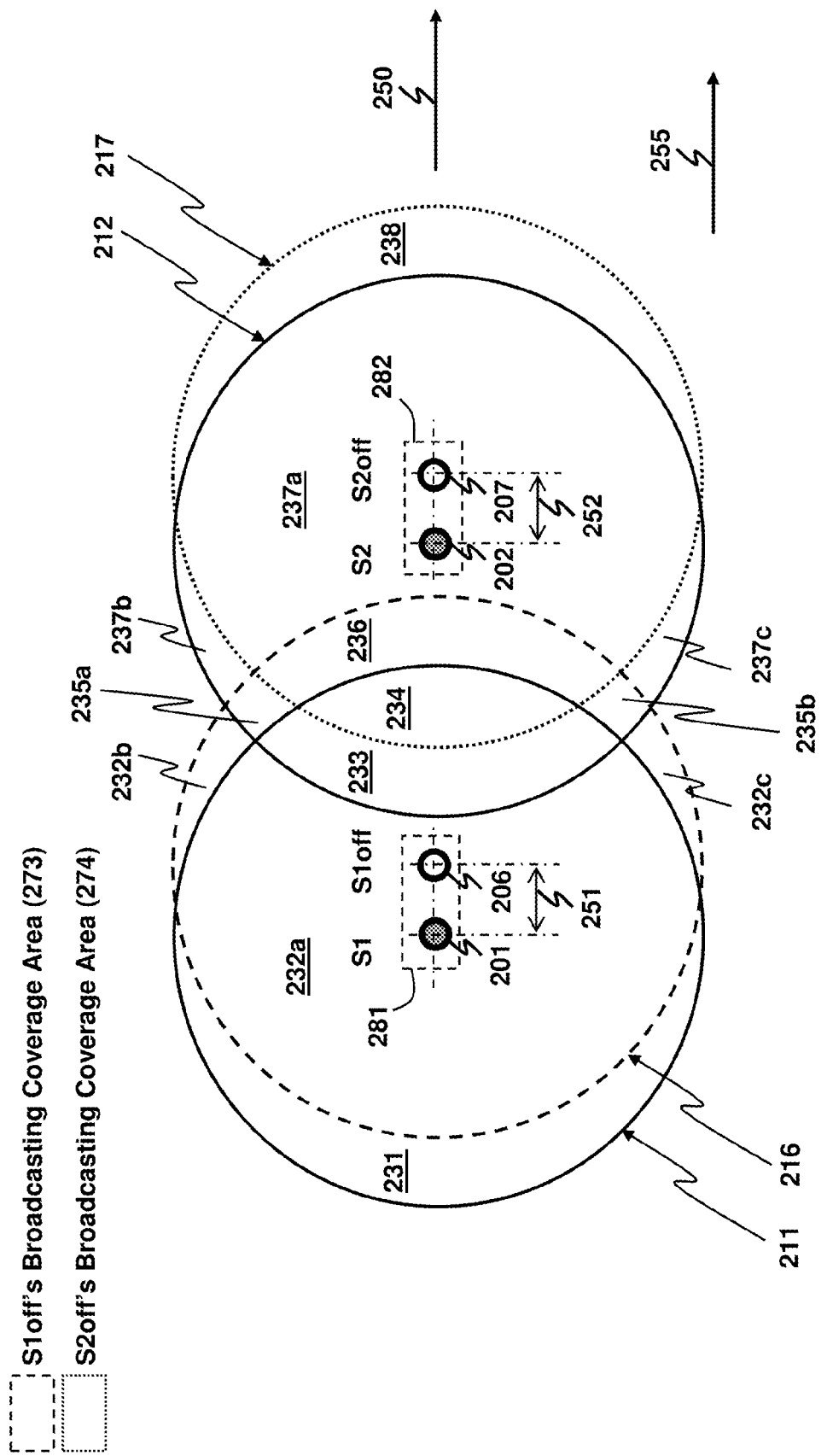
FIG. 2B depicts, in accordance with an exemplary embodiment of the present invention, the network of FIG. 2A further including an offset-assisted station for each of the primary stations, where the offset-assisted station is positioned from the primary station by an offset distance along a direction the same as a pointing direction from one primary station to another.
Figure 2C:
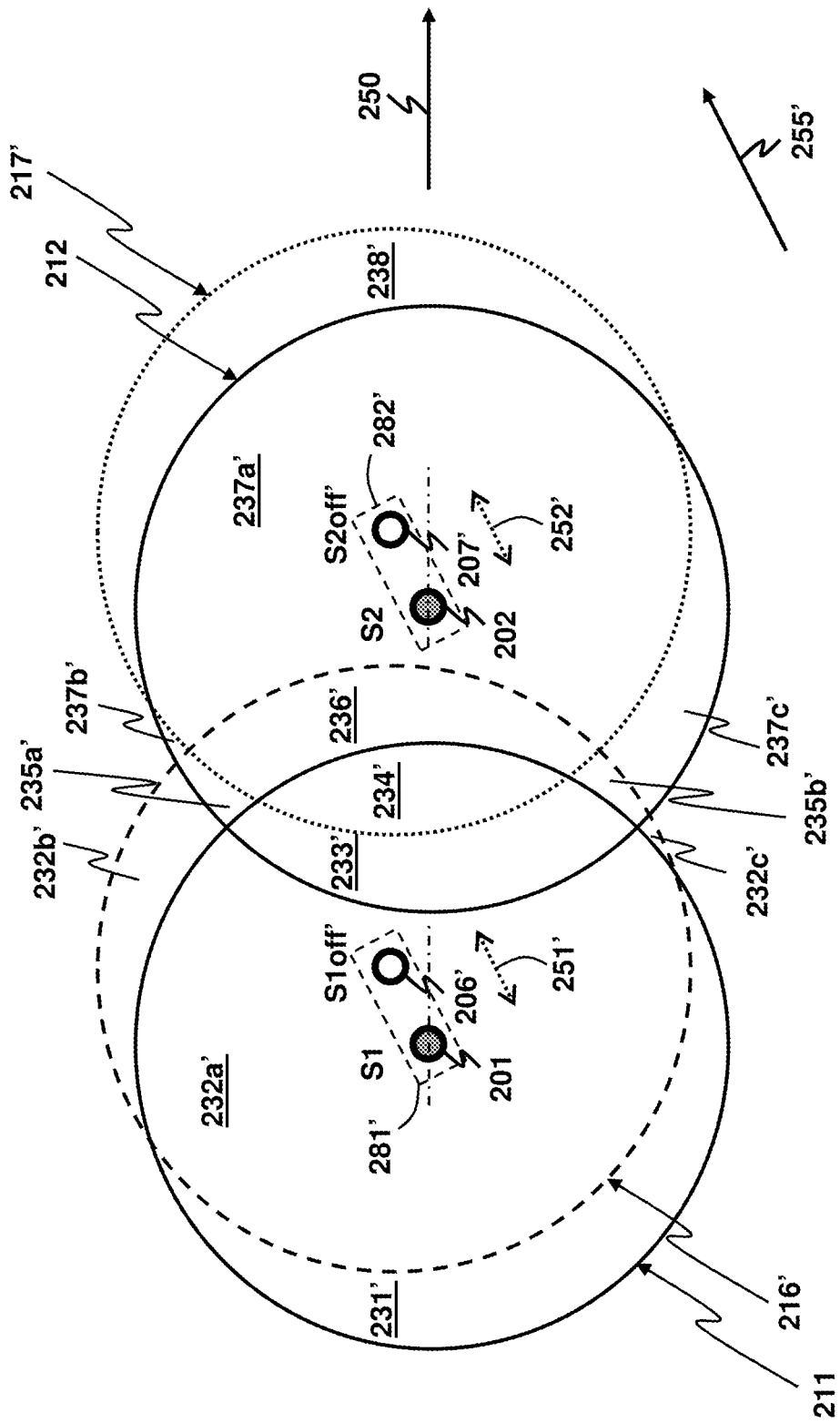
FIG. 2C depicts, in accordance with one embodiment of the present invention, the network of FIG. 2A further including an offset-assisted station for each of the primary stations, where, different from FIG. 2B, the offset-assisted station is shifted from the primary station in another direction different from the aforementioned pointing direction.
Figure 2D:
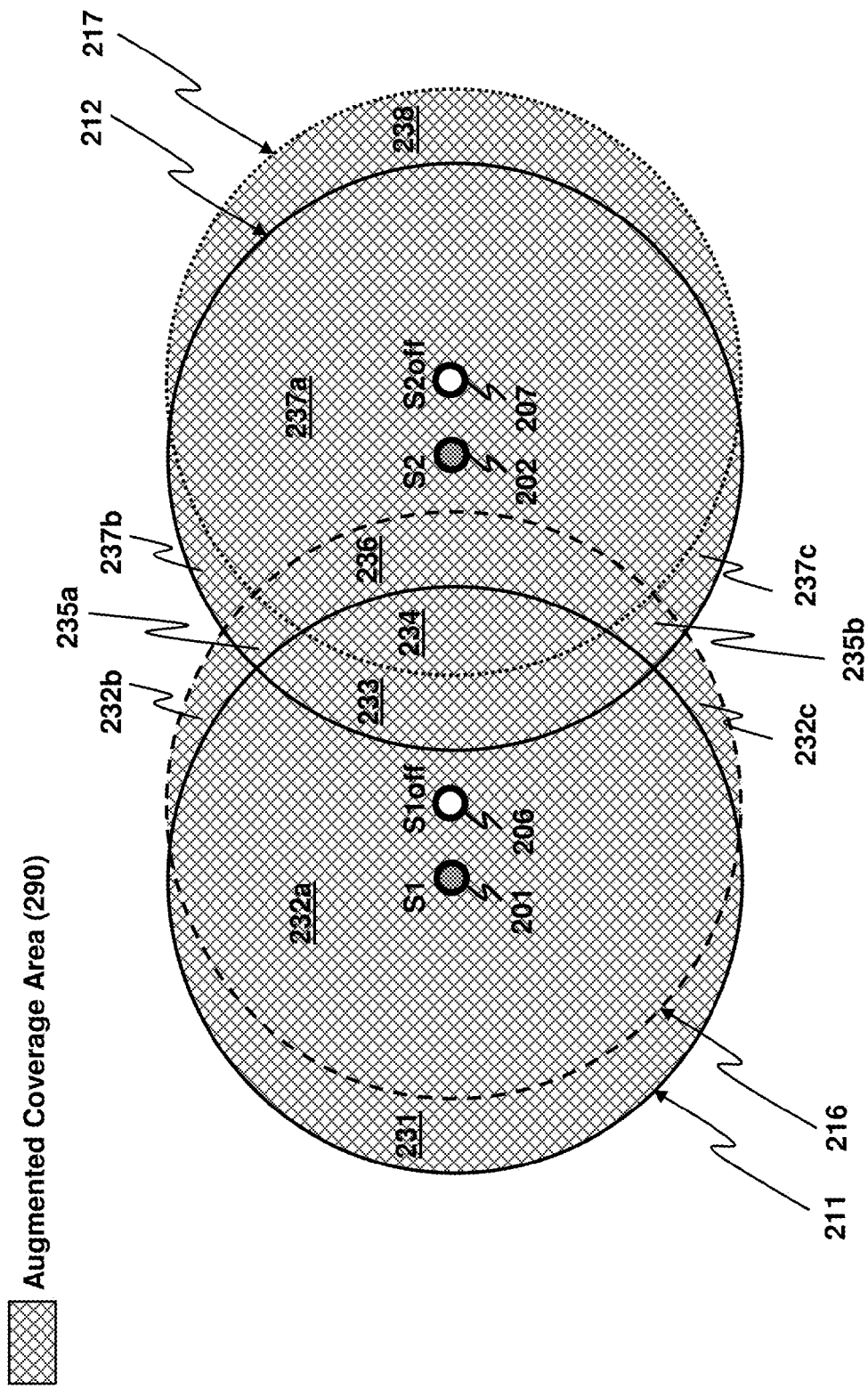
FIG. 2D illustrates that an augmented coverage area is formed by combining broadcasting coverage areas of all the primary and offset-assisted stations, and different zones are defined by partitioning the augmented coverage area along boundaries of the broadcasting coverage areas.

On top of FIG. 2A, FIG. 2B adds a first offset-assisted station 206 (labeled as "S1off") to the first primary station 201 to form a first cluster 281, and a second offset-assisted station 207 (labeled as "S2off") to the second primary station 202 to from a second cluster 282. The first and second offset-assisted stations 206, 207 are positioned from the first and second primary stations 201, 202 by a first distance 251 and a second distance 252, respectively, along a same direction 255. The first and second distances 251, 252 are equal. The direction 255 is set to be aligned with the pointing direction 250 for simplicity. The first offset-assisted station 206 has a third broadcasting coverage area 273, bounded by a third boundary 216, same in size with the first broadcasting coverage area 271. Similarly, the second offset-assisted station 207 has a fourth broadcasting coverage area 274, bounded by a fourth boundary 217, same in size with the second broadcasting coverage area 272. An entirety of the four broadcasting coverage areas 271-274 (the resultant area being referred to an augmented coverage area 290 as shown in FIG. 2D) is partitioned into different zones 231, 232a-c, 233, 234, 235a-b, 236, 237a-c, 238 along the four boundaries 211, 212, 216, 217.

Before analysis to the network of FIG. 2B is made, different zone types are first defined, as listed in Table 1.

TABLE 1

| Zone type | Condition |
|---|---|
| Zone A | Covered by one and only one beacon, either primary or secondary. |
| Zone B1 | Covered by the primary and secondary beacons belonged to only one cluster. |
| Zone B2 | Covered by three beacons, two of which are from one cluster and the remaining one of which is from another cluster. |
| Zone C | Covered by two beacons each from a different cluster, or covered by all the four beacons. |

In the forthcoming analysis, it is assumed that the mobile computing device determine whether it is closer to the first primary station 201 or the second primary station 202 by a simple majority voting rule according to the number of beacons received from the two clusters 281, 282. That is, the first primary station 201 is selected if the number of beacons received from the first cluster 281 is more than from the second cluster 282. Hence, "Zone C" is a jittering area. The majority voting rule reflects a worst-case scenario that the mobile computing device is only able to determine if it is inside or outside a given broadcasting coverage area. However, this worst-case scenario is useful to approximate practical cases when the mobile computing device is near the perimeter of a broadcasting coverage area. It can be seen from FIG. 1, where the third zone 130 of "far" is a large region between 2 m to 30 m from the station 105.

The classification of the zones 231, 232a-c, 233, 234, 235a-b, 236, 237a-c, 238 into different zone types is given in Table 2.

TABLE 2

| Zone | Beacon(s) received from | Zone type |
|---|---|---|
| 231 | S1 | A |
| 232a | S1, S1off | B1 |
| 232b | S1off | A |
| 232c | S1off | A |
| 233 | S1, S1off, S2 | B2 |
| 234 | S1, S1off, S2, S2off | C |
| 235a | S1off, S2 | C |
| 235b | S1off, S2 | C |
| 236 | S1off, S2, S2off | B2 |
| 237a | S2, S2off | B1 |
| 237b | S2 | A |
| 237c | S2 | A |
| 238 | S2off | A |

It is apparent that the zones 234, 235a, 235b amount to a modified jittering area after the introduction of the first and second offset-assisted stations 206, 207. The original jittering area 278 is given by a combination of the zones 233, 234. Obvious from visual inspection, the modified jittering area is smaller than the original jittering area 278, demonstrating the advantage of introducing the two offset-assisted stations 206, 207.

The arrangement shown on FIG. 2B is that the direction 255 of shifting the first and second offset-assisted station 206, 207 from the first and second primary stations 201, 202, respectively, follows the pointing direction 250 directed from the first primary station 201 to the second primary station 202. FIG. 2C depicts another option that the shifting direction is different from the pointing direction 250. On FIG. 2C, the numerals with apostrophes carry the same meanings with the corresponding numerals (without apostrophes) on FIG. 2B. It is obvious that the shifting direction 255' is not the same as the pointing direction 250. Furthermore, it is easy to see that zones 234', 235a', 235b' are classified as Zone C. Again, the resultant jittering area, which is a combination of the zones 234', 235a', 235b', is smaller than the original jittering area 278 by simple visual inspection. The result demonstrates that a reduction of jittering area is achievable even if the shifting direction 255' is not aligned with the pointing direction 250.

Figure 3:
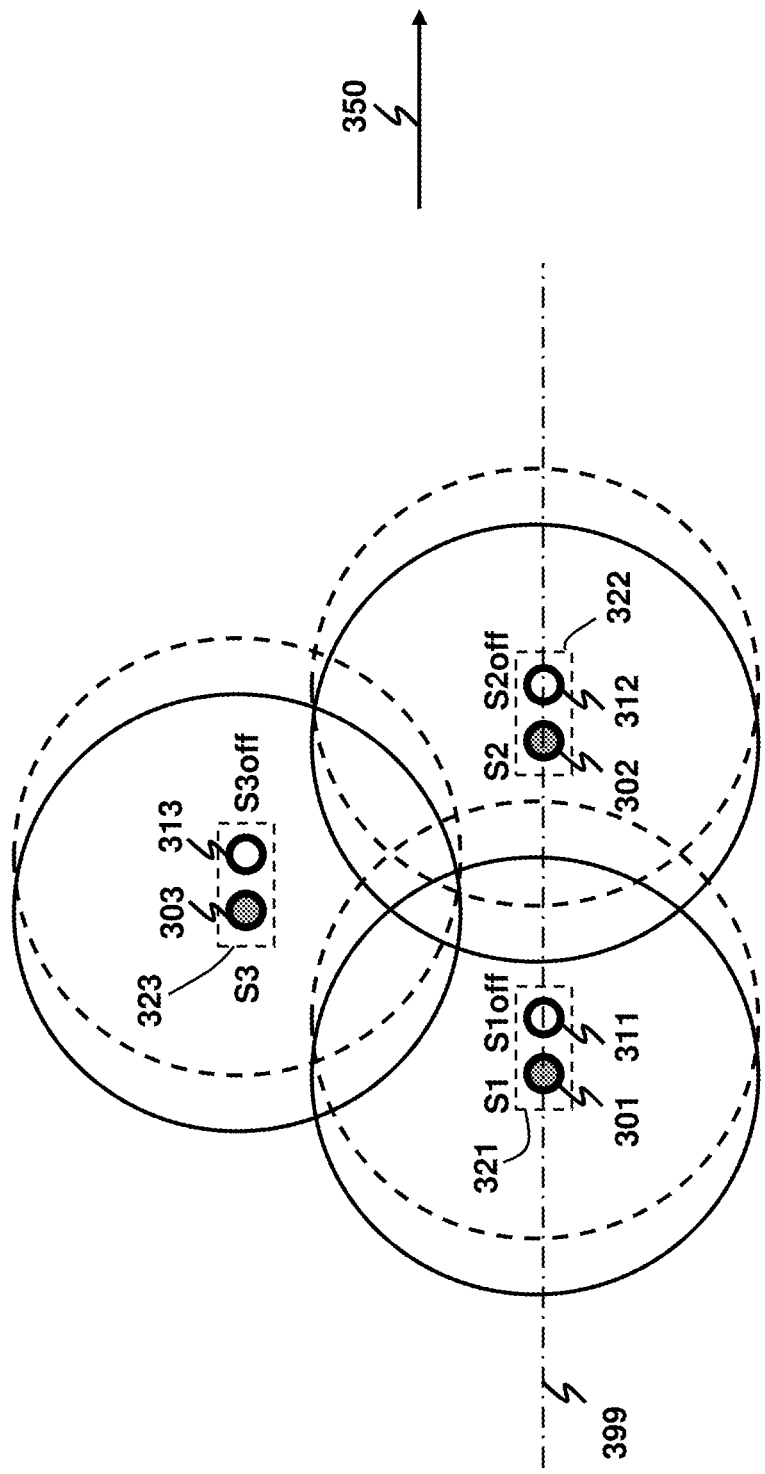
FIG. 3 illustrates one configuration of a network of primary stations and the resultant network after incorporating an offset-assisted station to each primary station to form a cluster.
Figure 4:
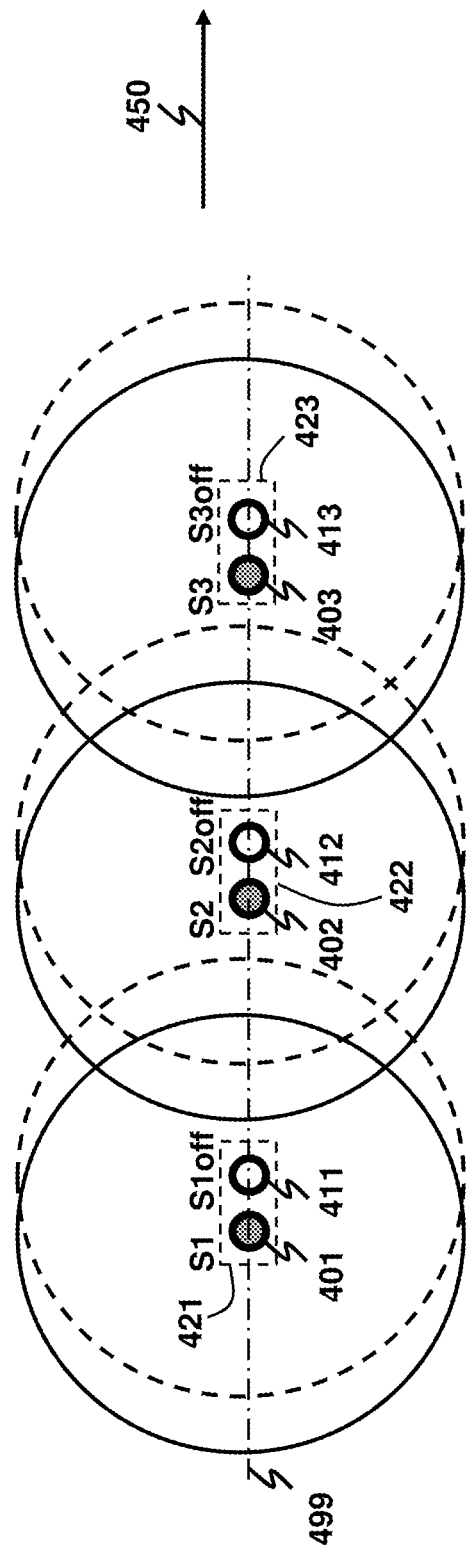
FIG. 4 illustrates another configuration of a network of primary stations and the resultant network after incorporating an offset-assisted station to each primary station to form a cluster.
Figure 5:
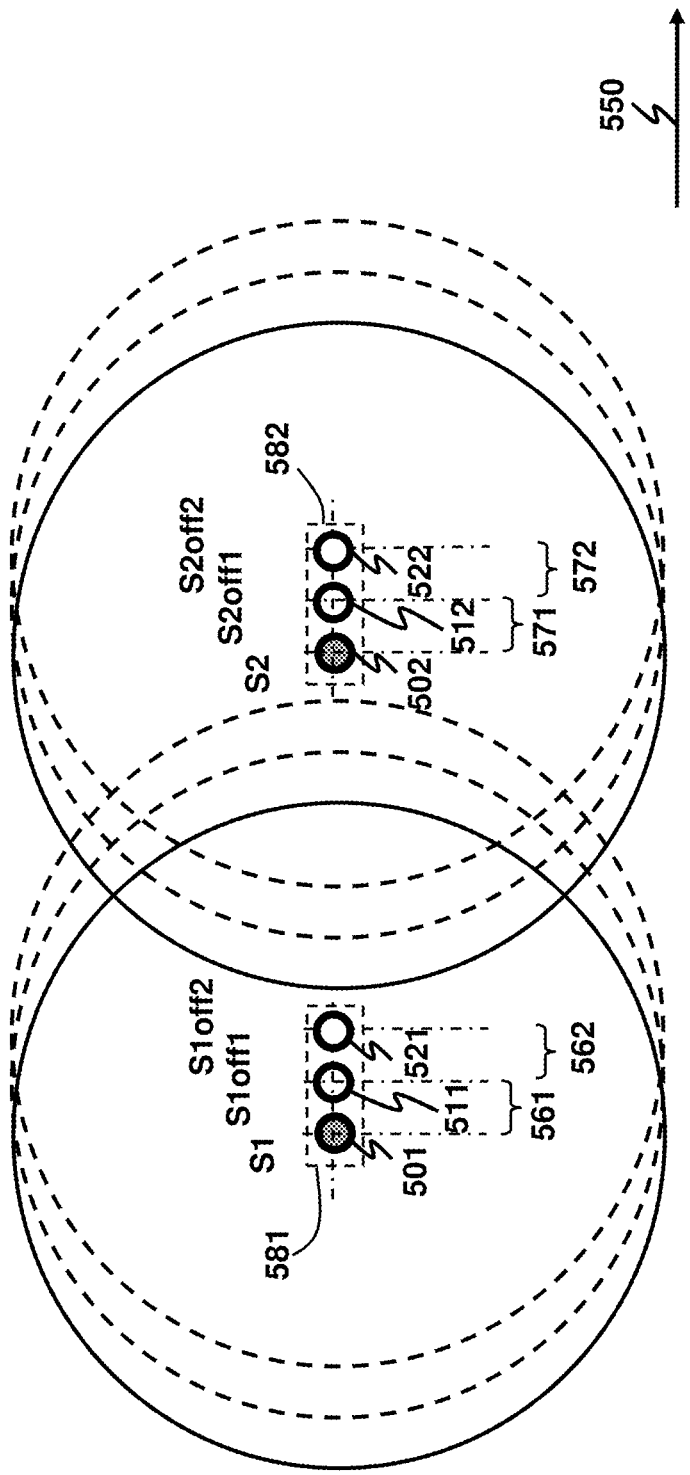
FIG. 5 illustrates a further configuration of a network of primary stations and the resultant network after incorporating two offset-assisted stations to each primary station to form a cluster.

Examples of other configurations of a network of primary stations are given in FIGS. 3-5.

FIG. 3 depicts a network comprising a first primary station 301, a second primary station 302 and a third primary station 303, where the three primary stations 301-303 have mutually partially-overlapped broadcasting coverage areas. A first offset-assisted station 311, a second offset-assisted station 312 and a third offset-assisted station 313 are positioned at the same offset distance from the first primary station 301, the second primary station 302 and the third primary station 303, respectively, along an orientation 350 directed from the first primary station 301 to the second primary station 302 (viz., along a straight line 399 linking the first and second primary stations 301, 302). As a result, a first cluster 321, a second cluster 322 and a third cluster 323 are formed.

FIG. 4 depicts another network comprising a first primary station 401, a second primary station 402 and a third primary station 403, where the first primary station 401 has a broadcasting coverage area partially overlapped with the second primary station 402's broadcasting coverage area at one end, and an opposite end thereof is in turn partially overlapped with the third primary station 403's broadcasting coverage area. In addition, the first, second and third primary stations 401-403 are located on a straight line 499. Similar to the network of FIG. 3, a first offset-assisted station 411, a second offset-assisted station 412 and a third offset-assisted station 413 are positioned at the same offset distance from the first primary station 401, the second primary station 402 and the third primary station 403, respectively, along an orientation 450 aligned with the straight line 499. A first cluster 421, a second cluster 422 and a third cluster 423 are then formed.

FIG. 5 is an example of having more-than-one offset-assisted stations in each cluster. In FIG. 5, it is depicted a network comprising a first primary station 501 (labeled as "S1") and a second primary station 502 (labeled as "S2") both having mutually partially-overlapped broadcasting coverage areas. A first cluster 581 is formed by including the first primary station 501 and a pair of first offset-assisted stations 511, 521 (respectively labeled as "S1off1" and "S1off2"). S1off1 511 is located from S1 501 by a first offset distance 561 along a pre-determined direction 550. In turn, S1off2 521 is located from S1off1 511 by a second offset distance 562 along the pre-determined direction 550. As a result, a first sequence of stations 51, S1off1, S1off2 is formed. Similarly, a second cluster 582 is formed by including the second primary station 502 and a pair of second offset-assisted stations 512, 522 (respectively labeled as "S2off1" and "S2off2"). S2off1 512 is located from S2 502 by a third offset distance 571 along the pre-determined direction 550. S2off2 522 is located from S2off1 512 by a fourth offset distance 572 also along the pre-determined direction 550. A second sequence of stations S2, S2off1, S2off2 is then formed. In addition, the first, second, third and fourth offset distances 561, 562, 571, 572 are equal.

In designing the disclosed system, it is required to determine the offset distance and the pre-determined direction used in defining the locations of the primary stations and the offset-assisted stations for all the clusters. In one embodiment, the pre-determined direction and the offset distance are selected such that in the individual cluster, all the one or more offset-assisted stations are located inside the primary station's broadcasting coverage area not overlapped with the broadcasting coverage area of any other cluster's primary station. Examples of this selection of the pre-determined direction and the offset distance are provided in FIGS. 2B, 2C and 3-5. In another embodiment, the pre-determined direction is substantially similar to a pointing direction from a first primary station to a second primary station, where the first and second primary stations are selected from the plural primary stations in the clusters and have overlapped broadcasting coverage areas. This choice of the pre-determined direction is exemplified in FIGS. 2B, 3 and 4. The offset distance may be selected to be less than half of the distance between the first and second primary stations. Take FIGS. 2A and 2B collectively as an example. The first primary station 201 and the second primary station 202 are separated by a distance 298. The offset distance, i.e. the first distance 251 or the second distance 252, is shorter than half of the distance 298.

A second aspect of the present invention is to improve the system disclosed in the first aspect of the present invention by reducing RSSI fluctuation. Diversity reception at the mobile computing device is employed in the reduction of RSSI fluctuation. In this regard, the system is configured to provide spatial diversity transmission to primary beacons and/or secondary beacons such that the mobile computing device can utilize spatial diversity reception.

Figure 6:
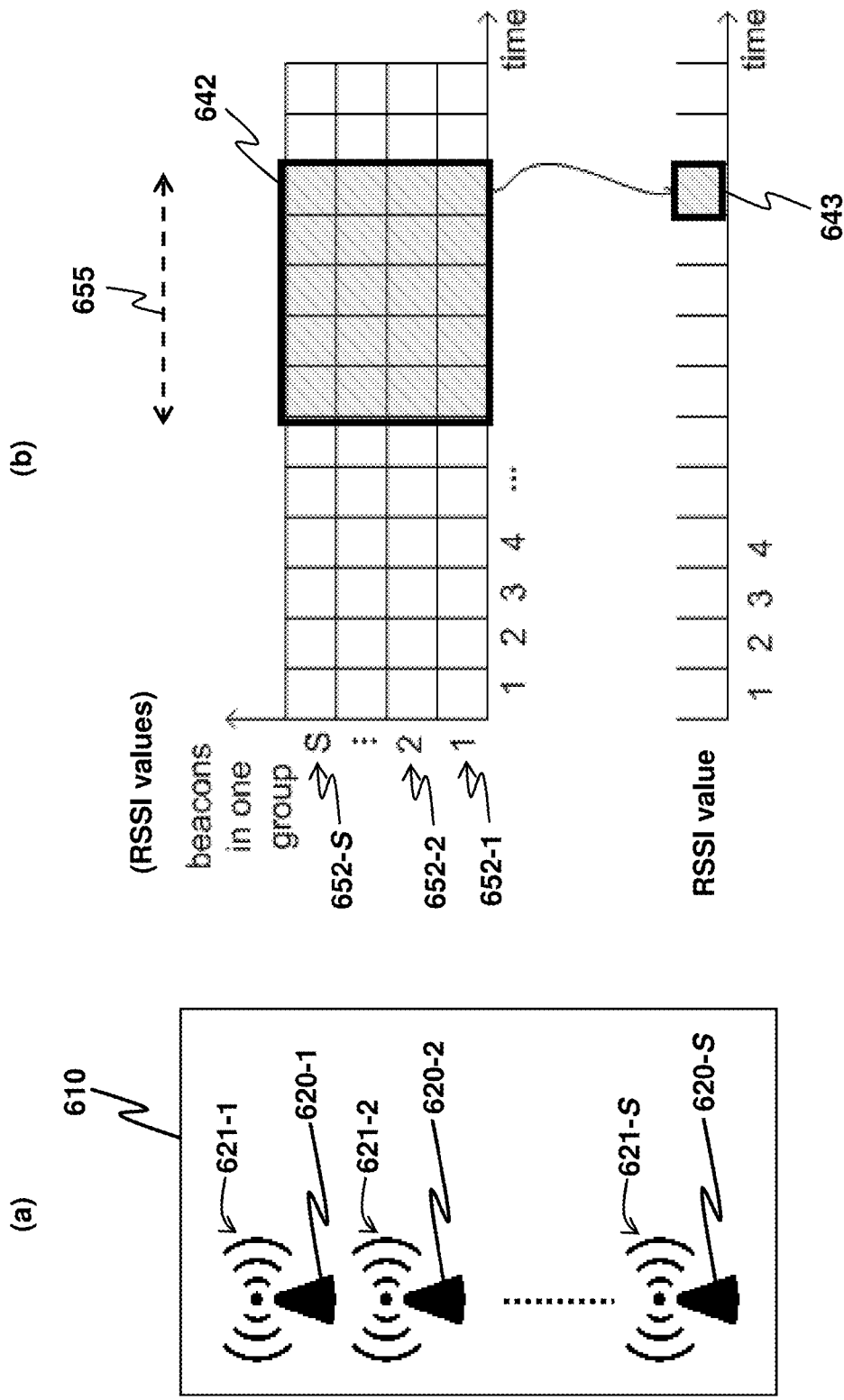
FIG. 6 depicts (a) a station, either a primary station or an offset-assisted station, having multiple broadcasting units for achieving spatial diversity, and (b) a space-time representation of component beacon signals generated by the station.

FIG. 6 depicts a station 610, either a primary station or an offset-assisted station, configured to provide spatial diversity transmission as shown in a subplot (a), and a space-time representation of signals generated by the station 610 as shown in a subplot (b). As depicted in the subplot (a), the station 610 comprises a group of plural co-located broadcasting units 620-1, 620-2, . . . , 620-S where S is greater than 1. As used herein, "the broadcasting units 620-1, 620-2, . . . , 620-S being co-located" means that the broadcasting units 620-1, 620-2, . . . , 620-S are integrated with the station 610, or are integrated together to form the station 610, such that the broadcasting units 620-1, 620-2, . . . , 620-S are deemed to be co-located. To achieve spatial diversity transmission, the broadcasting units 620-1, 620-2, . . . , 620-S are sufficiently mutually-spaced apart. The i-th broadcasting unit 620-$i$, $1 \le i \le S$, is configured to broadcast an i-th component beacon signal 621-$i$ such that the component beacon signals 621-1, 621-2, . . . , 621-S are broadcast from all the broadcasting units 620-1, 620-2, . . . , 620-S collectively form a beacon (either a primary beacon or a secondary beacon) of the station 610. In particular, the component beacon signals 621-1, 621-2, . . . , 621-S are configured to be individually distinguishable at the mobile computing device to thereby allow the mobile computing device to utilize diversity reception of the beacon to enhance a RSSI value thereof measured at the mobile computing device. As indicated in the subplot (b), the i-th component beacon signal 621-$i$ broadcast from the i-th broadcasting unit 620-$i$ is received and measured at the mobile computing device to give an i-th RSSI value 652-$i$. The S RSSI values 652-1, 652-2, . . . , 652-S can be directly used for spatial diversity reception.

One approach is to average the RSSI values 652-1, 652-2, ..., 652-S. As a result, the RSSI fluctuation is reduced. Additionally, time diversity can be used to further reduce the RSSI fluctuation. The i-th component beacon signal **621-*i* is measured at different time instants over a pre-defined time window 655 to give a space-time array of RSSI values 642. Averaging the array of RSSI values 642 gives a resultant RSSI value 643**, which is subject to less fluctuation.

To obtain the advantage of spatial and time diversity, at least one of the primary or offset-assisted stations in the clusters of the system is realized as the station 610. Advantageously and more preferably, each of the primary and offset-assisted stations in the clusters is realized as the station 610. When the station 610 is used as a primary station, the component beacon signal is referred to as a component primary-beacon signal, and the beacon mentioned above is a primary beacon. When the station 610 is used as an offset-assisted station, the component beacon signal is referred to as a component secondary-beacon signal, and the beacon mentioned above is a secondary beacon.

Figure 7:
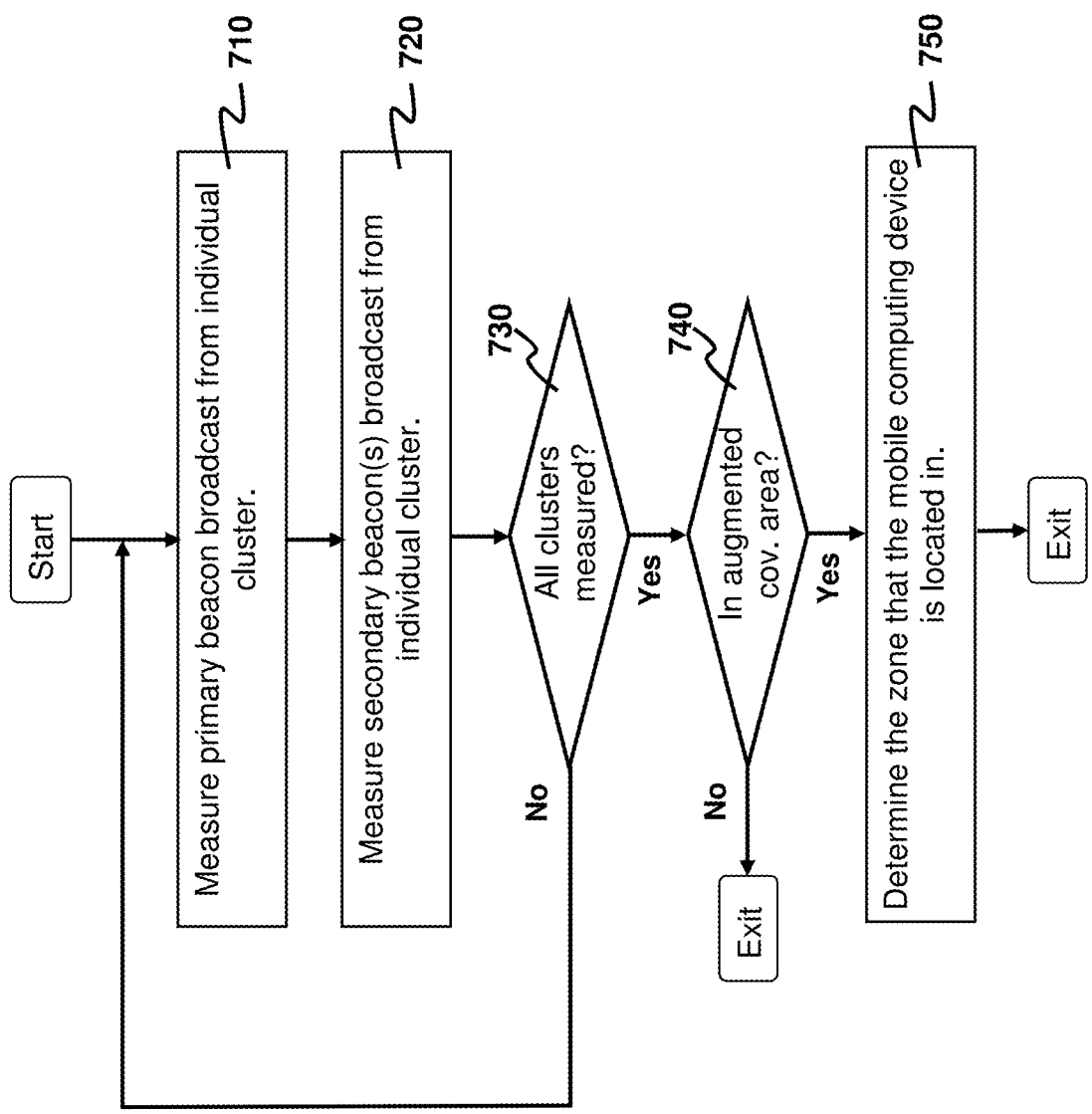
FIG. 7 depicts a flowchart of the steps in accordance with an exemplary embodiment of a method for the mobile computing device to perform location or proximity determination when any of the embodiments of the disclosed system is used.

A third aspect of the present invention is to provide a method for performing location or proximity determination when any of the embodiments of the system disclosed above is provided. The method is illustrated with the aid of FIG. 7, which depicts a flowchart of steps according to an exemplary embodiment of the method.

In a step 710, the primary beacon sent from the individual cluster and received at the mobile computing device is measured to give a first RSSI value unless the primary beacon is not detectable. In case the station 610 is used as the primary station in generating the primary beacon for utilizing spatial diversity, the first RSSI value is obtained by averaging plural RSSI values of the component primary-beacon signals broadcast from all the broadcasting units at the primary station. If time diversity is further utilized, each of the component primary-beacon signals broadcast from each broadcasting unit is measured at different time instants over a pre-defined time window to give more-than-one RSSI values for averaging.

In a step 720, the secondary beacon sent from an individual offset-assisted station in the individual cluster and received at the mobile computing device is measured to give a second RSSI value unless the secondary beacon is not detectable. Again, if the station 610 is used as the individual offset-assisted station in generating the secondary beacon for utilizing spatial diversity, the second RSSI value is obtained by averaging plural RSSI values of the component secondary-beacon signals broadcast from all the broadcasting units at the individual offset-assisted station. If time diversity is further utilized, each of the component secondary-beacon signals broadcast from each broadcasting unit is measured at different time instants over the pre-defined time window to give more-than-one RSSI values for averaging.

The steps 710 and 720 are repeated for the primary stations and the one or more offset-assisted stations of all the clusters (step 730).

In a step 740, whether the mobile computing device is located outside an augmented coverage area is determined according to the first and second RSSI values obtained in the step 730. The augmented coverage area is an area formed by augmenting the broadcasting coverage areas of the primary and offset-assisted stations in the clusters. FIG. 2D provides an example for illustrating the formation of augmented coverage area based on the network shown in FIG. 2B. The augmented coverage area 290 is the combination of the four broadcasting coverage areas 271-274.

If it is determined in the step 740 that the mobile computing device is not outside the augmented coverage area, a zone on which the mobile computing device is located is determined (step 750) according to the first and second RSSI values obtained in the step 730. In particular, the zone is selected from a plurality of candidate zones, where the candidate zones are obtained by partitioning the augmented coverage area along boundaries of the broadcasting coverage areas of all the primary and offset-assisted stations in the clusters. Take FIG. 2D as an illustrative example, the augmented coverage area 290 is partitioned along the first boundary 211, the second boundary 212, the third boundary 216 and the fourth boundary 217 to give the candidate zones 231, **232*a-c*, 233, 234, 235*a-b*, 236, 237*a-c*, 238**.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A system for enabling a mobile computing device to perform location or proximity determination, comprising:
    plural beacon-broadcasting clusters, an individual cluster comprising:
        a primary station for broadcasting a primary beacon, the primary station having a broadcasting coverage area; and
        an offset-assisted station for broadcasting a secondary beacon, the offset-assisted station having a broadcasting coverage area substantially similar to the primary station's broadcasting coverage area in size, the offset-assisted station being positioned from the primary station by an offset distance along a direction;
    wherein:
        the broadcasting coverage areas of adjacent two or more of the primary stations are mutually partially-overlapped;
        all the clusters use the same offset distance and the same direction in defining locations of the primary station and the offset-assisted station in the individual cluster, causing a jittering area, within which the mobile computing device is unable to determine which one of said adjacent two or more primary stations is closer to from detecting the primary beacons of said adjacent two or more primary stations, to be reduced by further utilizing the secondary beacons provided by the clusters having said adjacent two or more primary stations; and
        the mobile computing device is enabled to perform location or proximity determination by performing performing a process comprising the steps of;
            (a) measuring the primary beacon sent from the individual cluster and received at the mobile computing device to give a first received signal strength indicator (RSSI) value unless the primary beacon is not detectable;
            (b) measuring the secondary beacon sent from individual cluster and received at the mobile computing device to give a second RSSI value unless the secondary beacon is not detectable;
            (c) repeating the steps (a) and (b) for all the clusters;

(d) according to the first and second RSSI values obtained in the step (c), determining whether the mobile computing device is located outside an augmented coverage area formed by augmenting the broadcasting coverage areas of the primary and offset-assisted stations in the clusters; and (e) when it is determined in the step (d) that the mobile computing device is not outside the augmented coverage area, determining a zone on which the mobile computing device is located according to the first and second RSSI values obtained in the step (c), wherein the zone is selected from a plurality of candidate zones, the candidate zones being obtained by partitioning the augmented coverage area along boundaries of the broadcasting coverage areas of all the primary and offset-assisted stations in the clusters.

2. The system of claim 1, wherein the direction and the offset distance are selected such that in the individual cluster, the offset-assisted station is located inside the primary station's broadcasting coverage area not overlapped with the broadcasting coverage area of any other cluster's primary station.

3. The system of claim 1, wherein:
the direction is substantially similar to a pointing direction from a first primary station to a second primary station, wherein the first and second primary stations are selected from the plural primary stations in the clusters and have overlapped broadcasting coverage areas; and
the offset distance is less than half of the distance between the first and second primary stations.

4. The system of claim 1, wherein the primary beacon and the secondary beacons are compliant to a Bluetooth Low Energy (BLE) specification.

5. The system of claim 1, wherein in at least one of the clusters:
the primary station comprises a first group of plural co-located broadcasting units, each of the broadcasting units in the first group being configured to broadcast a component primary-beacon signal such that the component primary-beacon signals broadcast from all the broadcasting units in the first group collectively form the primary beacon, wherein the component primary-beacon signals from all the broadcasting units in the first group are individually distinguishable at the mobile computing device to thereby allow the mobile computing device to utilize diversity reception of the primary beacon to enhance a RSSI value thereof measured at the mobile computing device.

6. The system of claim 5, wherein in said one of the clusters:
the offset-assisted station comprises a second group of plural co-located broadcasting units, each of the broadcasting units in the second group being configured to broadcast a component secondary-beacon signal such that the component secondary-beacon signals broadcast from all the broadcasting units in the second group collectively form the secondary beacon, wherein the component secondary-beacon signals from all the broadcasting units in the second group are individually distinguishable at the mobile computing device to thereby allow the mobile computing device to utilize diversity reception of the secondary beacon to enhance a RSSI value thereof measured at the mobile computing device.

7. The system of claim 1, wherein in the individual cluster:
the primary station comprises a first group of plural co-located broadcasting units, each of the broadcasting units in the first group being configured to broadcast a component primary-beacon signal such that the component primary-beacon signals broadcast from all the broadcasting units in the first group collectively form the primary beacon, wherein the component primary-beacon signals from all the broadcasting units in the first group are individually distinguishable at the mobile computing device to thereby allow the mobile computing device to utilize diversity reception of the primary beacon to enhance a RSSI value thereof measured at the mobile computing device; and
the offset-assisted station comprises a second group of plural co-located broadcasting units, each of the broadcasting units in the second group being configured to broadcast a component secondary-beacon signal such that the component secondary-beacon signals broadcast from all the broadcasting units in the second group collectively form the secondary beacon, wherein the component secondary-beacon signals from all the broadcasting units in the second group are individually distinguishable at the mobile computing device to thereby allow the mobile computing device to utilize diversity reception of the secondary beacon to enhance a RSSI value thereof measured at the mobile computing device.

8. The system of claim 7, wherein each of the component primary-beacon signals and the component secondary-beacon signals is compliant to a Bluetooth Low Energy (BLE) specification.

9. A system for enabling a mobile computing device to perform location or proximity determination, comprising:
plural beacon-broadcasting clusters, an individual cluster comprising:
a primary station for broadcasting a primary beacon, the primary station having a broadcasting coverage area; and
plural offset-assisted stations each for broadcasting a secondary beacon, each of the offset-assisted stations having a broadcasting coverage area substantially similar to the primary station's broadcasting coverage area in size, the primary beacon and the offset-assisted stations of the individual cluster being positioned to form an evenly-spaced station sequence with the primary station at an end of the sequence, wherein successive stations in the sequence are spaced by an offset distance, and each offset-assisted station is oriented from the primary beacon along a direction;
wherein:
the broadcasting coverage areas of adjacent two or more of the primary stations are mutually partially-overlapped;
all the clusters use the same offset distance and the same direction in defining locations of the primary station and the offset-assisted stations in the individual cluster, causing a jittering area, within which the mobile computing device is unable to determine which one of said adjacent two or more primary stations is closer to from detecting the primary beacons of said adjacent two or more primary stations, to be reduced by further utilizing the secondary beacons provided by the clusters having said adjacent two or more primary stations; and
the mobile computing device is enabled to perform location or proximity determination by performing performing a process comprising the steps of:

(a) measuring the primary beacon sent from the individual cluster and received at the mobile computing device to give a first received signal strength indicator (RSSI) value unless the primary beacon is not detectable;
(b) measuring the secondary beacon sent from the offset-assisted stations of the individual cluster and received at the mobile computing device to give a second RSSI value unless the secondary beacon is not detectable;
(c) repeating the steps (a) and (b) for all the clusters and all the offset-assisted stations thereof;
(d) according to the first and second RSSI values obtained in the step (c), determining whether the mobile computing device is located outside an augmented coverage area formed by augmenting the broadcasting coverage areas of the primary and offset-assisted stations in the clusters; and
(e) when it is determined in the step (d) that the mobile computing device is not outside the augmented coverage area, determining a zone on which the mobile computing device is located according to the first and second RSSI values obtained in the step (c), wherein the zone is selected from a plurality of candidate zones, the candidate zones being obtained by partitioning the augmented coverage area along boundaries of the broadcasting coverage areas of all the primary and offset-assisted stations in the clusters.

10. The system of claim 9, wherein the direction and the offset distance are selected such that in the individual cluster, the offset-assisted stations are located inside the primary station's broadcasting coverage area not overlapped with the broadcasting coverage area of any other cluster's primary station.

11. The system of claim 9, wherein in the individual cluster:
the primary station comprises a first group of plural co-located broadcasting units, each of the broadcasting units in the first group being configured to broadcast a component primary-beacon signal such that the component primary-beacon signals broadcast from all the broadcasting units in the first group collectively form the primary beacon, wherein the component primary-beacon signals from all the broadcasting units in the first group are individually distinguishable at the mobile computing device to thereby allow the mobile computing device to utilize diversity reception of the primary beacon to enhance a RSSI value thereof measured at the mobile computing device; and
an individual offset-assisted station comprises a second group of plural co-located broadcasting units, each of the broadcasting units in the second group being configured to broadcast a component secondary-beacon signal such that the component secondary-beacon signals broadcast from all the broadcasting units in the second group collectively form the secondary beacon of the individual offset-assisted station, wherein the component secondary-beacon signals from all the broadcasting units in the second group are individually distinguishable at the mobile computing device to thereby allow the mobile computing device to utilize diversity reception of the secondary beacon to enhance a RSSI value thereof measured at the mobile computing device.

12. The system of claim 11, wherein each of the component primary-beacon signals and the component secondary-beacon signals is compliant to a Bluetooth Low Energy (BLE) specification.

* * * * *